(12) United States Patent
Onoda

(10) Patent No.: US 11,215,264 B2
(45) Date of Patent: Jan. 4, 2022

(54) ROLLER GEAR CAM MECHANISM

(71) Applicant: SANKYO SEISAKUSHO CO., Tokyo (JP)

(72) Inventor: Makoto Onoda, Kikugawa (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 186 days.

(21) Appl. No.: 16/489,328

(22) PCT Filed: Feb. 26, 2018

(86) PCT No.: PCT/JP2018/006982
§ 371 (c)(1),
(2) Date: Aug. 27, 2019

(87) PCT Pub. No.: WO2018/159539
PCT Pub. Date: Sep. 7, 2018

(65) Prior Publication Data
US 2019/0383358 A1 Dec. 19, 2019

(30) Foreign Application Priority Data

Feb. 28, 2017 (JP) .............................. JP2017-037597

(51) Int. Cl.
F16H 1/16 (2006.01)
F16C 19/26 (2006.01)
(Continued)

(52) U.S. Cl.
CPC ............. *F16H 1/166* (2013.01); *F16C 19/26* (2013.01); *F16H 55/08* (2013.01); *F16H 55/10* (2013.01); *F16H 55/24* (2013.01)

(58) Field of Classification Search
CPC .......... F16H 55/10; F16H 1/166; F16H 55/24; F16H 55/08; F16C 19/26
See application file for complete search history.

(56) References Cited

U.S. PATENT DOCUMENTS 626,515 A * 6/1899 Whitney ................. F16H 1/166
74/464
647,491 A * 4/1900 Hoffmann ............. F16H 57/039
74/424.7
(Continued)

FOREIGN PATENT DOCUMENTS

CN 105834766 A 8/2016
JP S50112655 A 9/1975
(Continued)

OTHER PUBLICATIONS

Extended European Search Report (EESR) dated Sep. 23, 2020 issued in corresponding EP Application No. 18761549.7.
(Continued)

*Primary Examiner* — Terence Boes
(74) *Attorney, Agent, or Firm* — Harness, Dickey & Pierce, P.L.C.

(57) ABSTRACT

A roller gear cam mechanism is equipped with a cam and a rotating member along the outer circumferential direction of which multiple bearings are arranged. The bearings are equipped with a shaft member and an outer ring portion capable of rotating around the shaft member. The outer circumferential surface of the outer ring portion has an arc shape, and in a cross section of the cam that includes the cam axis line, a contact portion of a cam rib making contact with the outer circumferential surface of the outer ring portion has an arc shape. The arc shape of the outer ring portion is formed so as to conform to the arc shape of the cam rib. The radius of curvature of the arc of the outer ring portion and the radius of curvature of the arc of the cam rib are determined in association with each other.

11 Claims, 8 Drawing Sheets

(51) Int. Cl.
 *F16H 55/08* (2006.01)
 *F16H 55/10* (2006.01)
 *F16H 55/24* (2006.01)

(56) References Cited

U.S. PATENT DOCUMENTS

| | | | | |
|---|---|---|---|---|
| 718,398 | A * | 1/1903 | Staehle | F16H 1/166 |
| | | | | 74/464 |
| 1,007,584 | A * | 10/1911 | Lord | F16H 1/166 |
| | | | | 74/464 |
| 1,361,154 | A * | 12/1920 | Henderson | F16H 55/10 |
| | | | | 384/508 |
| 2,191,865 | A * | 2/1940 | Schlachter | F16H 55/10 |
| | | | | 74/424.7 |
| 2,714,315 | A * | 8/1955 | Reader | F16H 1/166 |
| | | | | 74/465 |
| 3,597,990 | A | 8/1971 | McCartin | |
| 3,875,817 | A * | 4/1975 | Mayfield | F16H 55/10 |
| | | | | 74/465 |
| 4,665,763 | A | 5/1987 | James | |
| 4,917,511 | A | 4/1990 | Katsube | |
| 2018/0003293 | A1 * | 1/2018 | Figura | B62D 3/06 |
| 2019/0360574 | A1 * | 11/2019 | Chiu | F16H 55/24 |

FOREIGN PATENT DOCUMENTS

| | | |
|---|---|---|
| JP | S5346560 A | 4/1978 |
| JP | S57032244 U | 2/1982 |
| JP | 2006-125463 A | 5/2006 |
| JP | 2007211861 A | 8/2007 |
| JP | 2009185826 A | 8/2009 |
| JP | 2012067899 A | 4/2012 |
| WO | WO-0127495 A1 | 4/2001 |

OTHER PUBLICATIONS

International Search Report (in English and Japanese) issued in PCT/JP2018/006982, dated May 1, 2018; ISA/JP.
Office Action dated Jul. 28, 2021 in corresponding Taiwanese patent application.
Office Action dated Sep. 3, 2021 in corresponding Japanese patent application No. 2019-502980 with English translation.
Communication dated Oct. 7, 2021 issued in corresponding EP Application No. 18761549.7.

* cited by examiner

US 11,215,264 B2

ROLLER GEAR CAM MECHANISM

CROSS REFERENCE TO RELATED APPLICATIONS

This application is a U.S. National Phase Application under 35 U.S.C. 371 of International Application No. PCT/JP2018/006982 filed on Feb. 26, 2018, which is based on and claims the benefit of priority from Japanese Patent Application No. 2017-037597 filed on Feb. 28, 2017. The entire disclosures of all of the above applications are incorporated herein by reference.

TECHNICAL FIELD

The present invention relates to a roller gear cam mechanism which has no backlash, has high rigidity and highly efficient transmissibility, and is capable of acceleration and accuracy improvement.

BACKGROUND ART

A roller gear cam mechanism is a mechanism which, by engagement of a cam as one shaft having a cam rib in a screw shape exemplified by a concave globoidal cam (roller gear cam) and a plurality of bearings such as roller followers or cam followers arranged along an outer circumferential direction of a rotating member as the other shaft arranged orthogonally to the cam, transmits power with one shaft of the cam and the rotating member as an input shaft and the other shaft as an output shaft. The cam rib is tapered, a preload by a wedge effect is generated at a contact portion of the bearings and the cam rib by manipulating an intershaft distance of the input shaft and the output shaft, and backlash between input and output can be eliminated. In addition, since torque of the input shaft is transmitted to the output shaft by rolling contact of the bearings, rotation is performed smoothly without the backlash, and the torque is transmitted highly efficiently suppressing friction loss of the contact portion.

The bearing includes a shaft member and an outer ring portion, the outer ring portion in a roughly cylindrical shape is capable of rotating around the shaft member, and the preload is given to the contact portion of the bearing and the cam rib so that the outer ring portion rotates in line contact with the cam rib. In this case, at a rolling point of the contact portion of the bearing and the cam rib, since a speed of the outer ring portion of the bearing and a speed of the cam rib coincide, sliding does not occur. However, on a rotating member side from the rolling point of the contact portion of the bearing and the cam rib, since the speed of the cam rib is greater than the speed of the outer ring portion of the bearing, sliding occurs. In addition, on a cam side from the rolling point of the contact portion of the bearing and the cam rib, since the speed of the outer ring portion of the bearing is greater than the speed of the cam rib, sliding occurs. Since sliding occurs in such a manner, power transmission efficiency declines. Note that, when a radius of the roughly cylindrical shape is defined as r and a rotation number per unit time of the outer ring portion is defined as $N_r$, a speed $V_r$ of the outer ring portion of the bearing is determined by $V_r=2\pi \times r \times N_r$. In addition, when a distance from the rolling point to a rotation axis line of the cam is defined as $R_c$ and a rotation number per unit time of the cam is defined as $N_c$, a speed $V_{cam}$ at the rolling point of the cam rib is determined by $V_{cam}=2\pi \times R_c \times N_c$. At the rolling point, it is $V_r=V_{cam}(N_c=R_c/r \times N_c)$.

In addition, due to misalignment caused by a machining error of a generating line shape of the cam rib and the cylindrical shape of the outer ring portion of the bearing or the like, a stress distribution changes, and a position (that is, $R_c$) of the rolling point changes. Accordingly, a rotating speed of the outer ring portion of the bearing changes and causes vibrations and torque fluctuation or the like. Further, since a sliding portion between the bearing and the cam rib changes, the bearing and the cam rib are unevenly worn and driving torque becomes large.

In order to avoid stress concentration due to such misalignment, Patent Literature 1 discloses a cam follower that reduces a surface pressure in consideration of contact conditions including the misalignment. To the outer ring portion of the cam follower and/or the cam at the contact surface(s) with each other, logarithmic crowning is applied.

CITATION LIST

Patent Literature

Patent Literature 1: JP-A-2007-211861

SUMMARY

Technical Problem

Even in a cam follower by Patent Literature 1, since skew moment acts on an outer ring portion of the cam follower by sliding on both sides of a rolling point of a contact portion of the cam follower and a cam rib, the outer ring portion is inclined to a shaft member of the cam follower (skew is generated) and the outer ring portion moves to an axial direction of the shaft member so that there is a problem that a position of the rolling point changes. In addition, a load by movement in the axial direction of the outer ring portion may be received by inserting a ball between the outer ring portion and a flange portion of the shaft member, however, space is narrow and a large load cannot be received.

Accordingly, an object of the present invention is to solve the problem and provide a roller gear cam mechanism which has no backlash, has high rigidity and highly efficient transmissibility, and is capable of acceleration and accuracy improvement.

Solution to Problem

According to one viewpoint of the present invention, the roller gear cam mechanism includes: a cam that is capable of rotating on a cam axis line, and has a screw shape including a cam rib and a cam groove; a rotating member that is capable of rotating on a rotating member axis line vertical to the cam axis line; and multiple bearings that are arranged along an outer circumferential direction of the rotating member, and are capable of being in rolling contact with the cam rib. Each of the bearings includes a shaft member and an outer ring portion capable of rotating around the shaft member, at least a portion of an outer circumferential surface of the outer ring portion has an arc shape in a cross section of the outer ring portion including a center axis line of the outer ring portion, a contact portion of the cam rib making contact with at least a portion of the outer circumferential surface of the outer ring portion has an arc shape in a cross section of the cam including the cam axis line, and the arc shape of the outer ring portion is formed so as to conform to the arc shape of the cam rib, and a radius of curvature of the arc shape of the outer ring portion and a radius of curvature of the arc shape of the cam rib are determined in association with each other.

According to one concrete example of the present invention, in the roller gear cam mechanism, at least a portion of the outer circumferential surface of the outer ring portion has a convex surface shape to the center axis line of the outer ring portion, the contact portion of the cam rib has a concave surface shape conforming to the convex surface shape, and the radius of curvature of the arc shape of the cam rib is larger than the radius of curvature of the arc shape of the outer ring portion.

According to one concrete example of the present invention, in the roller gear cam mechanism, the radius of curvature of the arc shape of the outer ring portion is equal to or greater than a distance from the center axis line of the outer ring portion to at least a portion of the outer circumferential surface.

According to one concrete example of the present invention, in the roller gear cam mechanism, at least a portion of the outer circumferential surface of the outer ring portion has a concave surface shape to the center axis line of the outer ring portion, the contact portion of the cam rib has a convex surface shape conforming to the concave surface shape, and the radius of curvature of the arc shape of the outer ring portion is larger than the radius of curvature of the arc shape of the cam rib.

According to one concrete example of the present invention, in the roller gear cam mechanism, the radius of curvature on a side of the rotating member axis line of the arc shape of the outer ring portion is different from the radius of curvature on a side of the cam axis line of the arc shape of the outer ring portion.

According to one concrete example of the present invention, in the roller gear cam mechanism, the radius of curvature on a side of the rotating member axis line of the arc shape of the cam rib is different from the radius of curvature on a side of the cam axis line of the arc shape of the cam rib.

According to one concrete example of the present invention, in the roller gear cam mechanism, the radius of curvature of the arc shape of the outer ring portion and the radius of curvature of the arc shape of the cam rib are determined in association with each other, based on at least one of a preload given between each of the bearings and the cam rib, an applied load given between each of the bearings and the cam rib while the roller gear cam mechanism is operated, and an unbalanced load given by the outer ring portion moving in a direction of the center axis line.

According to one concrete example of the present invention, in the roller gear cam mechanism, the shaft member includes a pair of flange portions configured to hold an inner side portion of the outer ring portion between the flange portions, a gap is provided between each of the pair of flange portions and the inner side portion of the outer ring portion, and the radius of curvature of the arc shape of the outer ring portion and the radius of curvature of the arc shape of the cam rib are determined in association with each other so that the outer ring portion does not move for a width of the gap or more in the direction of the center axis line when each of the bearings is in contact with the cam rib.

According to one concrete example of the present invention, in the roller gear cam mechanism, the outer ring portion and the cam rib can be in line contact, and the radius of curvature of the arc shape of the outer ring portion and the radius of curvature of the arc shape of the cam rib are determined in association with each other so that an applied load is equally received at the contact portion of the cam rib.

According to one concrete example of the present invention, in the roller gear cam mechanism, each of the bearings is a roller follower or a cam follower.

According to one concrete example of the present invention, in the roller gear cam mechanism, each of the bearings is a rolling contact bearing or a sliding contact bearing.

Advantageous Effects

According to the present invention, by associating the outer circumferential surface of the outer ring portion of the bearing and a cam surface of the cam rib by the radius of curvature and turning the surfaces into the arc shape conforming to each other, a portion to be in sliding contact between the outer circumferential surface and the cam surface is reduced, and the roller gear cam mechanism can improve power transmission efficiency. In particular, by turning the outer circumferential surface and the cam surface into the convex surface shape and the concave surface shape or into the concave surface shape and the convex surface shape, turning the surfaces into the arc shape conforming to each other, and bringing the outer circumferential surface and the cam surface into contact, movement in an axis line direction of the outer ring portion is eliminated, the outer ring portion and the shaft member are not brought into contact, and the roller gear cam mechanism can suppress rotational torque and vibrations.

Other objects, features and advantages of the present invention will become apparent from the following description of the embodiments of the present invention taken in conjunction with the accompanying drawings.

DESCRIPTION

Hereinafter, embodiments of the present invention will be described with reference to the drawings, however, the present invention is not limited to the embodiments.

With reference to FIGS. 1-12, the embodiments of a roller gear cam mechanism of the present invention will be described.

Figure 1:
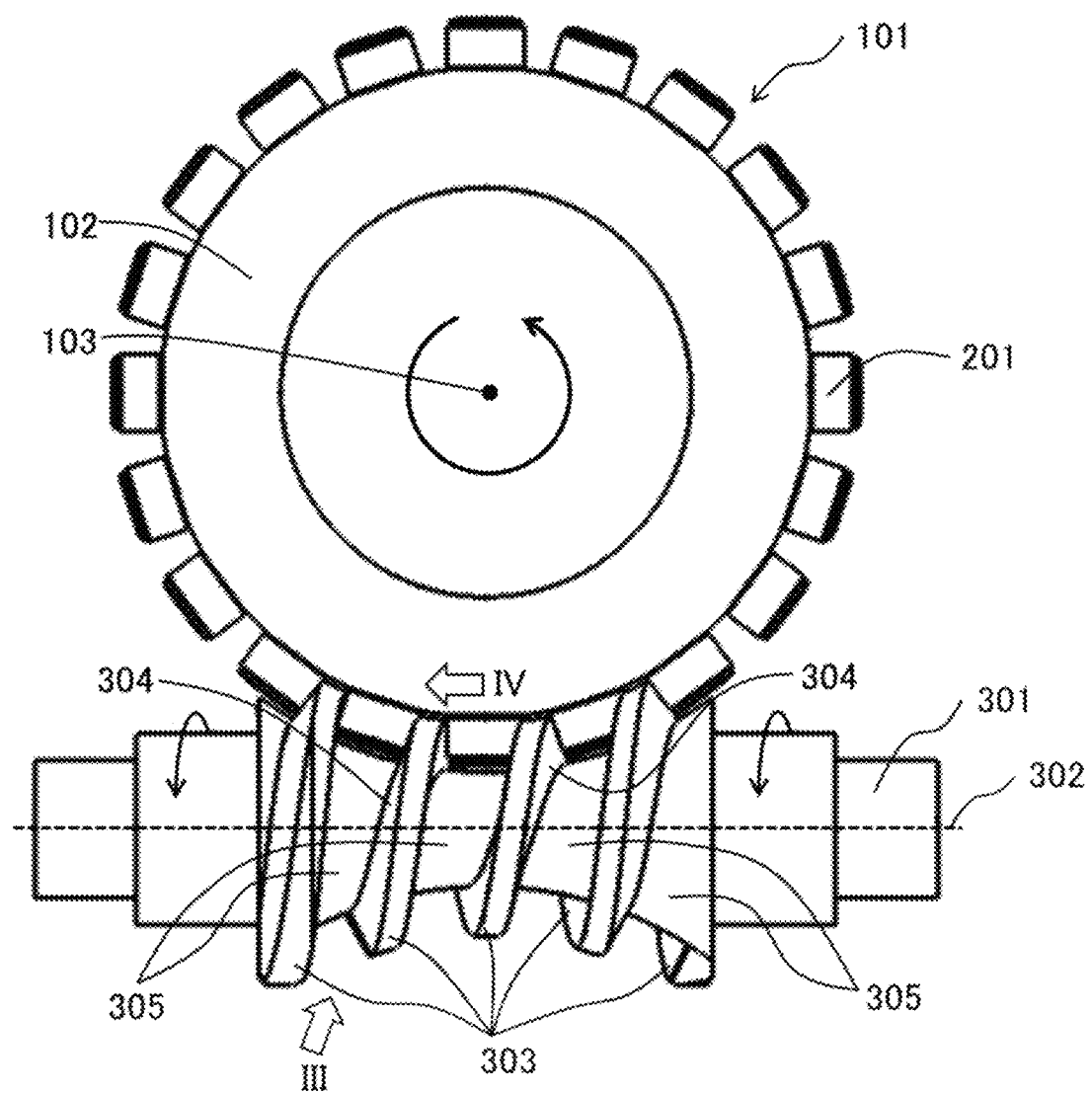
FIG. 1 is a schematic drawing of a view from the front of a roller gear cam mechanism as one embodiment of the present invention.
Figure 2:
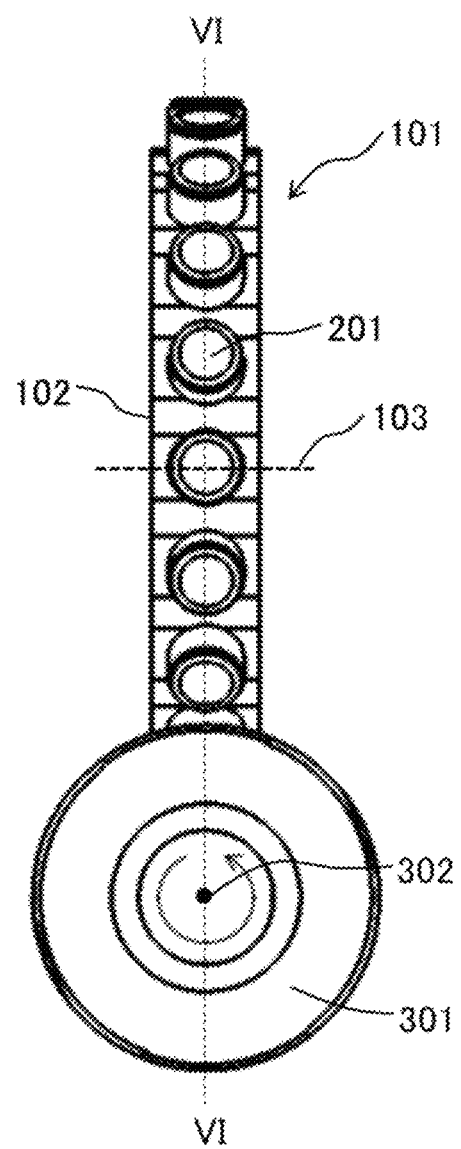
FIG. 2 is a schematic drawing of a view from the side of the roller gear cam mechanism in FIG. 1.

FIG. 1 and FIG. 2 are a schematic drawing of a view from the front of a roller gear cam mechanism 101 of the present invention and a schematic drawing of a view from the side respectively. The roller gear cam mechanism 101 includes: a cam 301 that is capable of rotating on a cam axis line 302 which is a rotation axis line, having a screw shape including a cam rib 303 and a cam groove 305; and a rotating member or a rotating table (rotating member, hereinafter) 102 that is capable of rotating on a rotating member axis line 103 which is a rotation axis line vertical to the cam axis line 302, for which each of multiple bearings 201 arranged along an outer circumferential direction of the rotating member 102 is capable of being in rolling contact with the cam rib 303. One of the cam axis line 302 and the rotating member axis line 103 is an input shaft, the other is an output shaft, and the relation may be reversed. Each of the bearings 201 is arranged along the outer circumferential direction of the rotating member 102 by being fitted to the rotating member 102 or the like. By each of the bearings 201 being in the rolling contact with a cam surface 304 of the cam rib 303, transmission efficiency to an output shaft side of torque inputted from the cam 301 or the rotating member 102 can be improved, and a service life of the roller gear cam mechanism 101 can be prolonged. In addition, since each of the bearings 201 and the cam surface 304 of the cam rib 303 are in line contact, high rigidity is provided against external force in a rotating direction of the rotating member 102.

Figure 3:
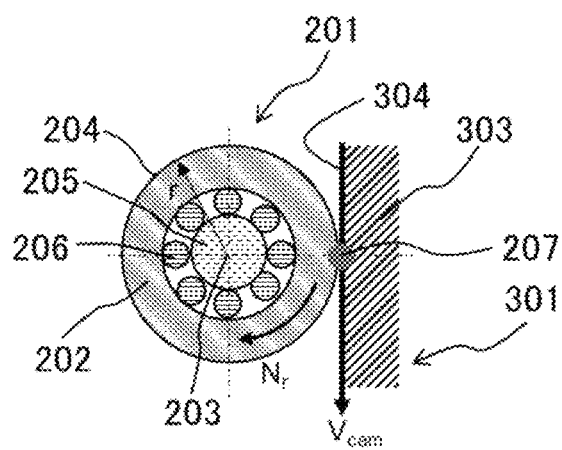
FIG. 3 is an enlarged schematic drawing showing contact of an outer ring portion of a bearing and a cam rib in a cross section vertical to a center axis line of the outer ring portion of the bearing, viewing from a direction III of the roller gear cam mechanism in FIG. 1.

FIG. 3 shows a contact relation between an outer circumferential surface 204 of an outer ring portion 202 and the cam surface 304 of the cam rib 303 in a cross section vertical to a center axis line 203 of the outer ring portion 202 of the bearing 201 in the case of viewing from a direction III of the roller gear cam mechanism 101 in FIG. 1. Each of the bearings 201 includes a shaft member 205, the outer ring portion 202 capable of rotating around the shaft member 205, and needles or rotating rollers 206 capable of rotating between the outer ring portion 202 and the shaft member 205. Note that the bearing 201 may not include the needles or rotating rollers 206. The outer circumferential surface 204 and the cam surface 304 are in contact with a rolling point 207 in rolling contact as a center. In this case, when $V_{cam}$ is a speed at the rolling point 207 of the cam surface 304, r is a distance from the center axis line 203 of the outer circumferential surface 204, that is, a radius, and $N_r$ is a rotation number per unit time of the outer ring portion 202, since the outer circumferential surface 204 and the cam surface 304 are in the rolling contact (not in sliding contact) at the rolling point 207, the speed of the cam surface 304 and the speed of the outer circumferential surface 204 at the rolling point 207 are identical, and it is $V_{cam}=2\pi \times r \times N_r$.

Figure 4:
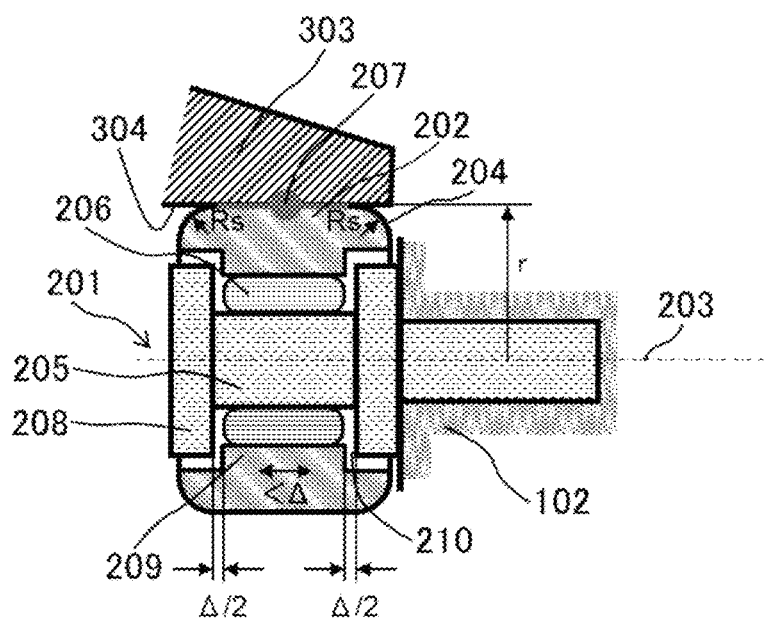
FIG. 4 is an enlarged sectional view showing contact of the outer ring portion of a conventional bearing and the cam rib.
Figure 5:
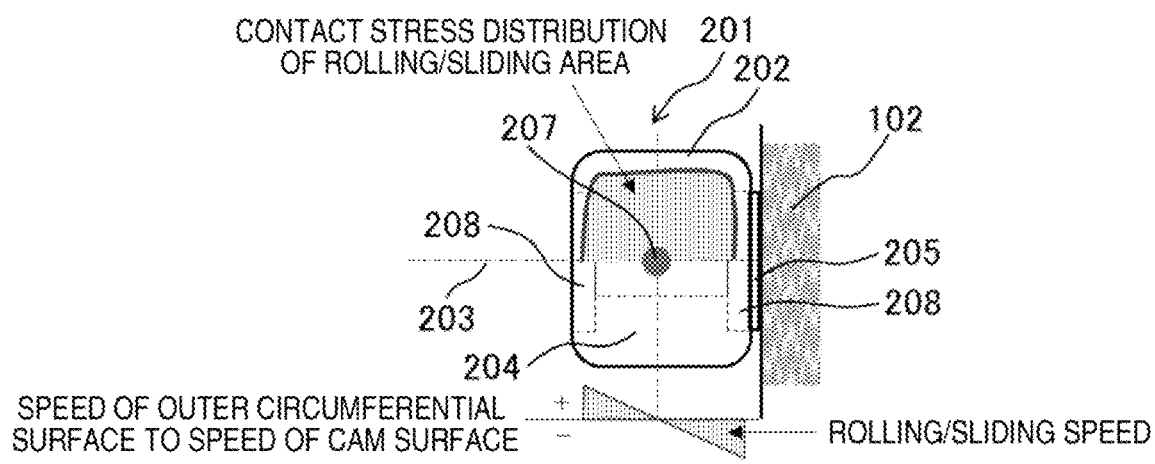
FIG. 5 is a drawing showing a contact stress distribution by the contact of the outer ring portion of the conventional bearing and the cam rib and a speed portion of an outer circumferential surface of the outer ring portion, viewing from a direction IV of the roller gear cam mechanism in FIG. 1.

FIG. 4 is an enlarged sectional view illustrating a contact relation between the outer circumferential surface 204 of the outer ring portion 202 of a conventional bearing 201 and the cam surface 304 of the cam rib 303. In addition, FIG. 5 shows a contact stress distribution by the contact of the outer circumferential surface 204 of the outer ring portion 202 of the conventional bearing 201 and the cam surface 304 of the cam rib 303 and a speed portion of the outer circumferential surface 204 in the case of viewing from a direction IV of the roller gear cam mechanism in FIG. 1. The outer circumferential surface 204 and the cam surface 304 are in contact with the rolling point 207 as the center. The outer circumferential surface 204 and the cam surface 304 are in the rolling contact at the rolling point 207 but are in the sliding contact at the portions other than the rolling point 207 since the speed at the portions other than the rolling point 207 of the cam surface 304 in contact is different from the speed of the outer circumferential surface 204. The speed of the outer circumferential surface 204 becomes lower than the speed on the side of the rotating member 102 from the rolling point 207 of the cam surface 304, and becomes higher than the speed on the side of the cam 301 from the rolling point 207 of the cam surface 304. Since sliding due to difference in the speed is generated in such a manner, power transmission efficiency of the roller gear cam mechanism 101 declines. Further, since misalignment due to a machining error of the cam surface 304 of the cam rib 303 and the outer ring portion 202 of the bearing 201 is generated, the rolling point 207 moves in the direction of the center axis line 203, and an inner side portion 209 of the outer ring portion 202 of the conventional bearing 201 and a flange portion 208 of the shaft member 205 of the conventional bearing 201 are brought into contact, causing reduction of rotational torque and vibrations of the roller gear cam mechanism 101.

Figure 6:
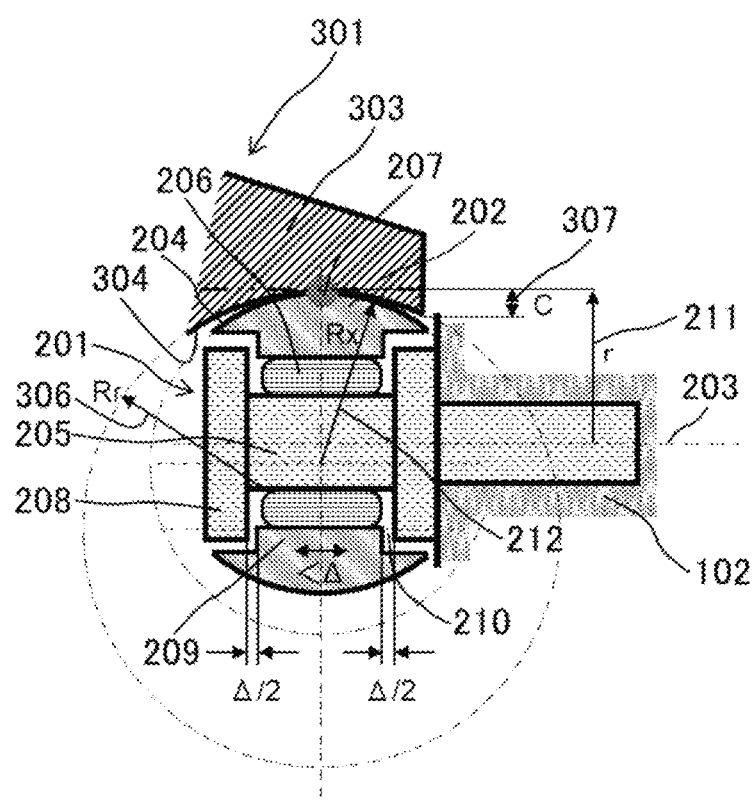
FIG. 6 is an enlarged sectional view showing the contact of the outer ring portion of the bearing and the cam rib as one embodiment of the present invention.

FIG. 6 is an enlarged sectional view illustrating a contact relation between the outer circumferential surface 204 of the outer ring portion 202 of the bearing 201 and the cam surface 304 of the cam rib 303, in one embodiment of the bearing 201 and the cam 301 of the roller gear cam mechanism 101 of the present invention. The outer circumferential surface 204 of the outer ring portion 202 of the bearing 201 has an arc shape in the cross section of the outer ring portion 202 including the center axis line 203 of the outer ring portion 202. Note that a portion of the outer circumferential surface 204 may have the arc shape. A contact portion of the cam surface 304 of the cam rib 303 making contact with the outer circumferential surface 204 of the outer ring portion 202 has the arc shape in the cross section of the cam 301 including the cam axis line 302. Note that, in the case of FIG. 6, the cross section of the outer ring portion 202 including the center axis line 203 of the outer ring portion 202 and the cross section of the cam 301 including the cam axis line 302 are the identical cross section, and are a planar cross section along VI-VI in FIG. 2. The arc shape of the outer circumferential surface 204 of the outer ring portion 202 is configured to conform to the arc shape of the cam surface 304 of the cam rib 303, that is, the arc shape of the outer circumferential surface 204 of the outer ring portion 202 is configured to bend in roughly the same direction as the arc shape of the cam surface 304 of the cam rib 303, and a first radius 212 of curvature of the arc shape of the outer circumferential surface 204 of the outer ring portion 202 and a radius 306 of curvature of the arc shape of the cam surface 304 of the cam rib 303 are determined in association with each other. In this way, by associating the outer circumferential surface 204 of the outer ring portion 202 and the cam surface 304 of the cam rib 303 by the radius of curvature and turning the surfaces into the arc shape conforming to each other, a portion to be in the sliding contact between the outer circumferential surface 204 of the outer ring portion 202 and the cam surface 304 of the cam rib 303 is reduced so that the roller gear cam mechanism 101 can improve the power transmission efficiency.

In FIG. 6, the outer circumferential surface 204 of the outer ring portion 202 may have a convex surface shape to the center axis line 203 of the outer ring portion 202, and the contact portion of the cam surface 304 of the cam rib 303 may have a concave surface shape conforming to the convex surface shape of the outer circumferential surface 204. In this case, the radius 306 of curvature of the arc shape of the cam surface 304 of the cam rib 303 is larger than the first radius 212 of curvature of the arc shape of the outer circumferential surface 204 of the outer ring portion 202. In addition, the first radius 212 of curvature of the arc shape of the outer circumferential surface 204 of the outer ring portion 202 may be equal to or more than a distance from the center axis line 203 of the outer ring portion 202 to the outer circumferential surface 204, that is, a radius 211 of the outer ring portion 202. When the outer circumferential surface 204 is turned to the convex surface shape by removing an edge side of the outer ring portion 202 in FIG. 5 so as to have the first radius 212 of curvature like the outer ring portion 202 in FIG. 6 and the cam surface 304 is turned to the concave surface shape conforming to the convex surface shape of the outer circumferential surface 204 further, compared to the outer ring portion 202 and the cam rib 303 in FIG. 5, an inertia moment of the outer ring portion 202 is reduced so that the outer ring portion 202 can be rotated at a high speed, and the cam rib 303 becomes thick according to a depth 307 of a concave surface of the cam rib 303 conforming to the convex surface shape of the outer ring portion 202 so that the roller gear cam mechanism 101 can improve the rigidity of the cam rib 303.

Figure 7:
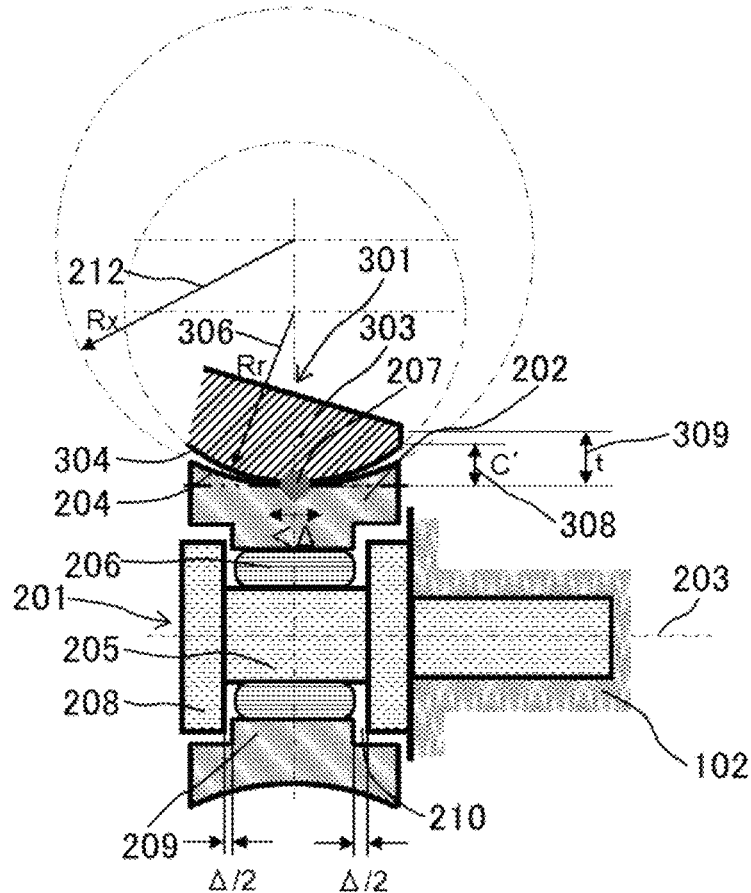
FIG. 7 is an enlarged sectional view showing the contact of the outer ring portion of the bearing and the cam rib as another embodiment of the present invention.

FIG. 7 is an enlarged sectional view illustrating a contact relation between the outer circumferential surface 204 of the outer ring portion 202 of the bearing 201 and the cam surface 304 of the cam rib 303, in another embodiment of the bearing 201 and the cam 301 of the roller gear cam mechanism 101 of the present invention. In FIG. 7, similarly to FIG. 6, the outer circumferential surface 204 of the outer ring portion 202 of the bearing 201 has the arc shape in the cross section of the outer ring portion 202 including the center axis line 203 of the outer ring portion 202. Note that a portion of the outer circumferential surface 204 may have the arc shape. The contact portion of the cam surface 304 of the cam rib 303 making contact with the outer circumferential surface 204 of the outer ring portion 202 has the arc shape in the cross section of the cam 301 including the cam axis line 302. Note that, in the case of FIG. 7, similarly to FIG. 6, the cross section of the outer ring portion 202 including the center axis line 203 of the outer ring portion 202 and the cross section of the cam 301 including the cam axis line 302 are the identical cross section. In FIG. 7 as well, the arc shape of the outer circumferential surface 204 of the outer ring portion 202 is configured to conform to the arc shape of the cam surface 304 of the cam rib 303, that is, the arc shape of the outer circumferential surface 204 of the outer ring portion 202 is configured to bend in roughly the same direction as the arc shape of the cam surface 304 of the cam rib 303, and the first radius 212 of curvature of the arc shape of the outer circumferential surface 204 of the outer ring portion 202 and the radius 306 of curvature of the arc shape of the cam surface 304 of the cam rib 303 are determined in association with each other. In this way, by associating the outer circumferential surface 204 of the outer ring portion 202 and the cam surface 304 of the cam rib 303 by the radius of curvature, turning the surfaces into the arc shape conforming to each other and bringing the outer circumferential surface 204 and the cam surface 304 into contact, the portion to be in the sliding contact between the outer circumferential surface 204 of the outer ring portion 202 and the cam surface 304 of the cam rib 303 is reduced so that the roller gear cam mechanism 101 can improve the power transmission efficiency.

In FIG. 7, the outer circumferential surface 204 of the outer ring portion 202 has the concave surface shape to the center axis line 203 of the outer ring portion 202, and the contact portion of the cam surface 304 of the cam rib 303 has the convex surface shape conforming to the concave surface shape of the outer circumferential surface 204. In this case, the first radius 212 of curvature of the arc shape of the outer circumferential surface 204 of the outer ring portion 202 is larger than the radius 306 of curvature of the arc shape of the cam surface 304 of the cam rib 303. When the cam surface 304 is turned to the convex surface shape by removing an edge side of the cam rib 303 in FIG. 5 so as to have the radius 306 of curvature like the cam rib 303 in FIG. 7 and the outer circumferential surface 204 is turned to the concave surface shape conforming to the convex surface shape of the cam surface 304, compared to the outer ring portion 202 and the cam rib 303 in FIG. 5, a thickness 309 can be reduced like the cam rib 303 in FIG. 7, and it is effective when an applied load when operating the roller gear cam mechanism 101 is small.

As shown in FIG. 6 and FIG. 7, by associating the outer circumferential surface 204 of the outer ring portion 202 and the cam surface 304 of the cam rib 303 by the radius of curvature, turning the surfaces into the convex surface shape and the concave surface shape or the concave surface shape and the convex surface shape respectively, turning the surfaces into the arc shape conforming to each other and bringing the outer circumferential surface 204 and the cam surface 304 into contact, movement in the direction of the center axis line 203 of the outer ring portion 202 is eliminated or reduced, and even when misalignment is caused by the machining error of the cam surface 304 of the cam rib 303 and the outer ring portion 202 of the bearing 201, the inner side portion 209 of the outer ring portion 202 and the flange portion 208 of the shaft member 205 are not brought into contact, and the rotational torque and vibrations of the roller gear cam mechanism 101 can be suppressed. Further, wear of the inner side portion 209 and the flange portion 208 can be eliminated.

Figure 8:
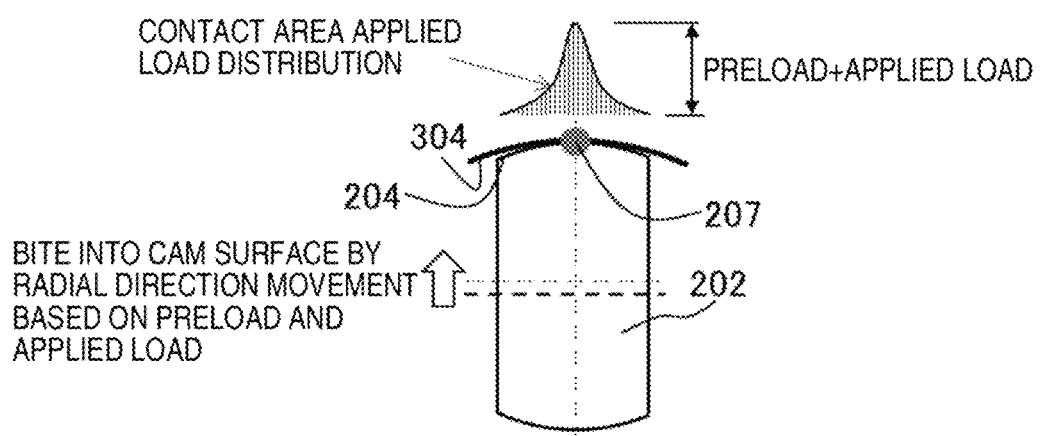
FIG. 8 is an enlarged schematic drawing showing the contact by radial direction movement of the outer ring portion of the outer ring portion of the bearing and the cam rib in FIG. 6.

As shown in FIG. 8, in the roller gear cam mechanism 101, by manipulating an inter-shaft distance of the rotating member axis line 103 and the cam axis line 302 so as to eliminate backlash, a preload by a wedge effect is generated between the outer circumferential surface 204 of the outer ring portion 202 of the individual bearing 201 and the cam surface 304 of the cam rib 303. Further, while the roller gear cam mechanism 101 is operated, an applied load by a load coupled to the rotating member 102 and rotated is generated between the outer circumferential surface 204 of the outer ring portion 202 of the individual bearing 201 and the cam surface 304 of the cam rib 303. Based on the preload and the applied load, the outer ring portion 202 moves in a radial direction, and the outer ring portion 202 and the cam rib 303 are brought into contact such that the outer circumferential surface 204 bites into the cam surface 304. By the contact, the load symmetrical with the rolling point 207 as the center is distributed between the outer circumferential surface 204 and the cam surface 304.

Figure 9:
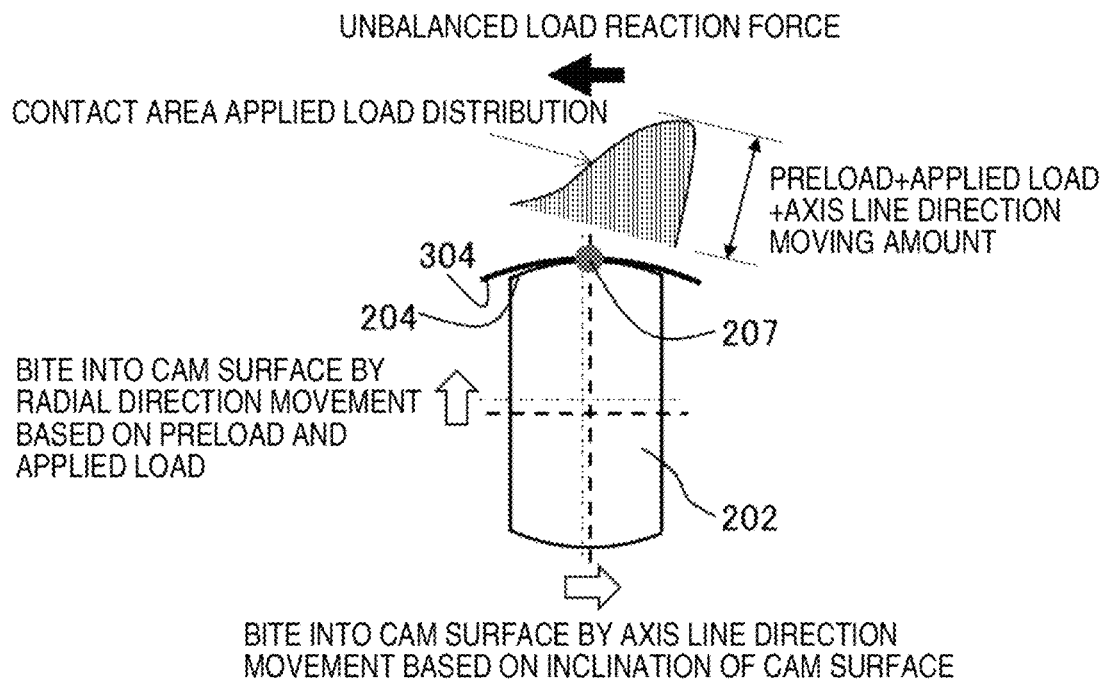
FIG. 9 is an enlarged schematic drawing showing the contact by the radial direction movement and axis line direction movement of the outer ring portion of the outer ring portion of the bearing and the cam rib in FIG. 6.
Figure 10:
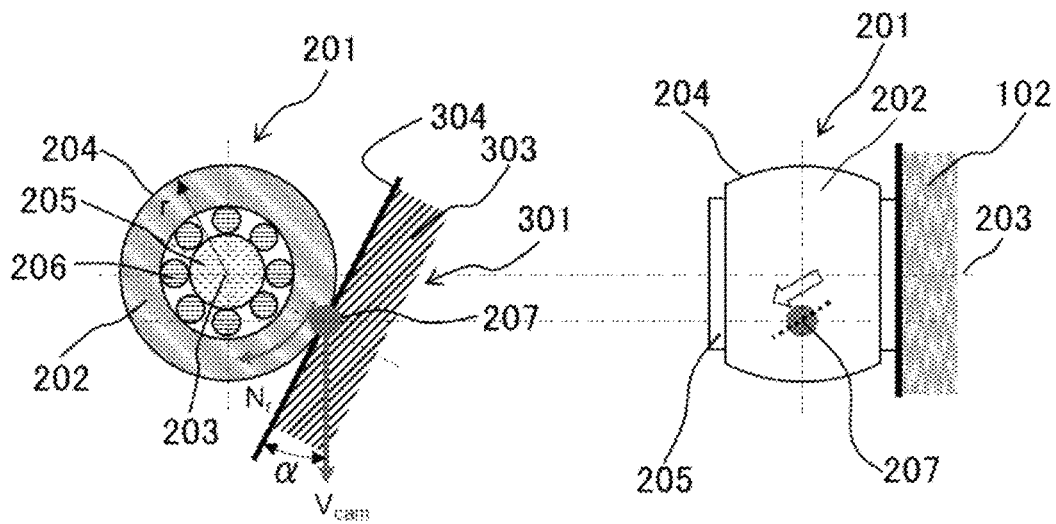
FIG. 10 is an enlarged schematic drawing showing the contact of the outer ring portion of the bearing and the cam rib in a case where the cam rib is inclined, in a cross section vertical to the center axis line of the outer ring portion of the bearing, viewing from the direction III of the roller gear cam mechanism in FIG. 1, and an enlarged schematic drawing showing a relation between the outer ring portion of the bearing and a rolling point, viewing from the direction IV of the roller gear cam mechanism in FIG. 1.

As shown in FIG. 9, while the roller gear cam mechanism 101 is operated, by inclination of the cam surface 304, the outer ring portion 202 moves in the direction of the center axis line 203, and the outer ring portion 202 and the cam rib 303 are brought into contact such that the outer circumferential surface 204 bites into the cam surface 304. FIG. 10 shows a contact relation between the outer circumferential surface 204 of the outer ring portion 202 and the cam surface 304 of the cam rib 303 in the cross section vertical to the center axis line 203 of the outer ring portion 202 of the bearing 201 including the rolling point 207 in the case of viewing from the direction III of the roller gear cam mechanism 101 in FIG. 1, and a relation between the outer ring portion 202 of the bearing 201 and the rolling point 207 in the case of viewing from the direction IV of the roller gear cam mechanism 101 in FIG. 1. The outer circumferential surface 204 and the cam surface 304 are in contact with the rolling point 207 as the center. The outer circumferential surface 204 and the cam surface 304 are in the rolling contact at the rolling point 207 but are in the sliding contact at the portions other than the rolling point 207 since the speed at the portions other than the rolling point 207 of the cam surface 304 in contact is different from the speed of the outer circumferential surface 204. Then, the cam surface 304 has a speed $V_{cam}$ (the outer circumferential surface 204 is rotated at the speed $V_{cam}$) by the rotation on the cam axis line 302 of the cam 301 at the rolling point 207, and is in the rolling contact with the outer circumferential surface 204 so as to have the inclination of an angle α to the speed $V_{cam}$ since the cam rib 303 is twisted in a screw shape. On the other hand, at the respective portions other than the rolling point 207 of the cam surface 304 in contact, since the cam surface 304 is in the sliding contact with the outer circumferential surface 204 such that not only the speed by the rotation on the cam axis line 302 of the cam 301 is different from each other but also the inclination angle α by the twist of the cam rib 303 to the speed is different from each other, the outer ring portion 202 has a motion component of moving in the direction of the center axis line 203 as an arrow in FIG. 10, and as shown in FIG. 9, an unbalanced load which is asymmetric is distributed between the outer circumferential surface 204 and the cam surface 304, and unbalanced load reaction force to the outer circumferential surface 204 is generated on the cam surface 304.

Figure 11:
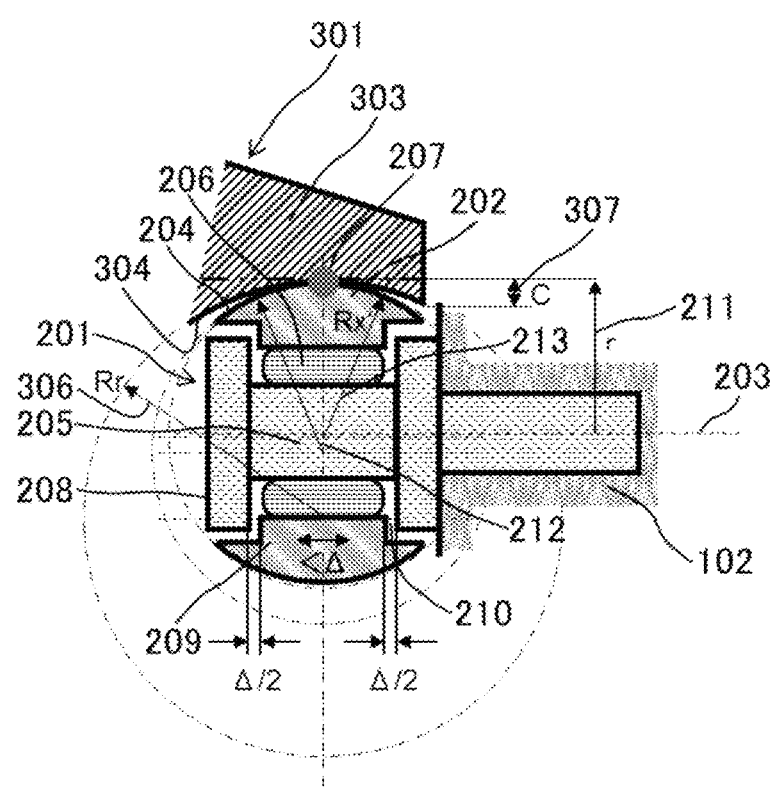
FIG. 11 is an enlarged sectional view showing the contact of the outer ring portion of the bearing and the cam rib as a still another embodiment of the present invention.

In the case where the load is unbalanced in this way, in order to avoid stress concentration, FIG. 11 is an enlarged sectional view showing a contact relation between the outer circumferential surface 204 of the outer ring portion 202 of the bearing 201 and the cam surface 304 of the cam rib 303 as a still another embodiment of the bearing 201 and the cam 301 of the roller gear cam mechanism 101 of the present invention. As shown in FIG. 11, the radius of curvature on the side of the rotating member axis line 103 of the rotating member 102 of the arc shape of the outer circumferential surface 204 of the outer ring portion 202 may be different from the radius of curvature on the side of the cam axis line 302 of the cam 301 of the arc shape of the outer circumferential surface 204 of the outer ring portion 202. In FIG. 11, a second radius 213 of curvature of the outer ring portion 202 on the side of the rotating member axis line 103 is smaller than the first radius 212 of curvature of the outer ring portion 202 on the side of the cam axis line 302. Note that, since in which direction to the center axis line 203 the outer ring portion 202 moves depends on a contact state between the outer ring portion 202 of the bearing 201 and the cam rib 303 of the cam 301 in each roller gear cam mechanism 101 to be designed, the screw shape of the cam rib 303 and the cam groove 305 of the cam 301 for example, which of the first radius 212 of curvature and the second radius 213 of curvature is to be made smaller is determined according to each roller gear cam mechanism 101.

In addition, the radius of curvature on the side of the rotating member axis line 103 of the rotating member 102 of the arc shape of the cam surface 304 of the cam rib 303 may be different from the radius of curvature on the side of the cam axis line 302 of the cam 301 of the arc shape of the cam surface 304 of the cam rib 303. In this case as well, which of the radius of curvature on the side of the rotating member axis line 103 and the radius of curvature on the side of the cam axis line 302 is to be made smaller depends on each roller gear cam mechanism 101 to be designed.

The first radius 212 of curvature and the second radius 213 of curvature of the arc shape of the outer circumferential surface 204 of the outer ring portion 202 and the radius 306 of curvature of the arc shape of the cam surface 304 of the cam rib 303 may be determined in association with each other, based on at least one of the preload given between the individual bearing 201 and the cam rib 303, the applied load given between the individual bearing 201 and the cam rib 303 while the roller gear cam mechanism 101 is operated, and the unbalanced load given by the outer ring portion 202 of the bearing 201 moving in the direction of the center axis line 203. As described above, the preload is given by manipulating the inter-shaft distance of the rotating member axis line 103 and the cam axis line 302 so as to eliminate the backlash, and the applied load is given by the load coupled to the rotating member 102 and rotated while the roller gear cam mechanism 101 is operated. In addition, the unbalanced load is given by the outer ring portion 202 moving in the direction of the center axis line 203 due to difference in the twist of the screw shape of the cam rib 303 at the individual contact portion of the cam surface 304 with the outer circumferential surface 204 or the like. Using a moving amount in the radial direction of the outer ring portion 202 based on the given preload and the given applied load and a moving amount in the direction of the center axis line 203 of the outer ring portion 202 based on the inclination of the cam surface 304 due to the twist of the cam rib 303, a load distribution as shown in FIG. 8 and FIG. 9 can be calculated by Hertzian contact stress formula or the like. Based on the calculated load distribution, the first radius 212 of curvature and the second radius 213 of curvature of the arc shape of the outer circumferential surface 204 and the radius 306 of curvature of the arc shape of the cam surface 304 that are optimum may be determined.

The shaft member 205 of the bearing 201 includes a pair of flange portions 208, and the outer ring portion 202 is rotated on the center axis line 203 such that the inner side portion 209 conforms to the pair of flange portions 208. A gap 210 is provided between each of the pair of flange portions 208 and the inner side portion 209. The first radius 212 of curvature and the second radius 213 of curvature of the arc shape of the outer ring portion 202 and the radius 306 of curvature of the arc shape of the cam surface 304 of the cam rib 303 may be determined in association with each other so that the outer ring portion 202 does not move for a width Δ/2 of each gap 210 or more in the direction of the center axis line 203 when the outer circumferential surface 204 of the outer ring portion 202 is in contact with the cam surface 304 of the cam rib 303. Thus, the inner side portion 209 of the outer ring portion 202 and the flange portions 208 of the shaft member 205 are not brought into contact, and the roller gear cam mechanism 101 can suppress the rotational torque and vibrations. Further, the wear of the inner side portion 209 and the flange portions 208 can be eliminated.

Figure 12:
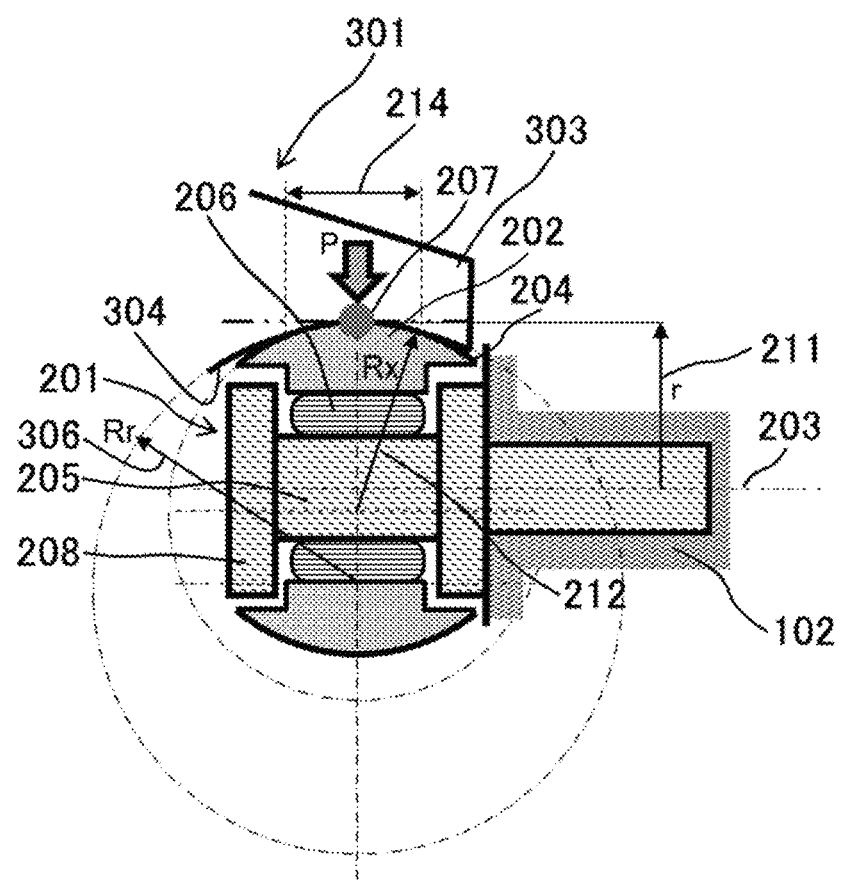
FIG. 12 is an enlarged sectional view showing line contact of the outer ring portion of the bearing and the cam rib in FIG. 6.

As shown in FIG. 12, when an applied load P is generated, the outer circumferential surface 204 and the cam surface 304 are in line contact by a contact length 214 of a length L with the rolling point 207 as the center, and in the case of being in the line contact in such a manner, the first radius 212 of curvature of the arc shape of the outer circumferential surface 204 and the radius 306 of curvature of the arc shape of the cam surface 304 may be determined by using Hertzian stress calculation as follows.

When the applied load P is applied as shown in FIG. 12 to two objects from a direction vertical to a shared tangent plane where the two objects are in contact, the two objects are brought into contact so as to have an elliptic contact portion having a long radius a and a short radius b. The Hertzian stress calculation is used to obtain the long radius a and the short radius b. According to the Hertzian stress calculation, when curvatures of the two objects on two planes which are vertical to the shared tangent plane and are also vertical to each other are defined as $\rho_{1I}$, $\rho_{1II}$, $\rho_{2I}$ and $\rho_{2II}$, an auxiliary variable cos τ is defined as below.

$$\cos\tau = \frac{\sqrt{(\rho_{1I}-\rho_{1II})^2 + 2(\rho_{1I}-\rho_{1II})(\rho_{2I}-\rho_{2II})\cos\omega + (\rho_{2I}-\rho_{2II})^2}}{\rho_{1I}+\rho_{1II}+\rho_{2I}+\rho_{2II}} \quad [\text{MATH. 1}]$$

Here, $\rho_{1I}$ is the curvature on a plane I of an object 1, $\rho_{1II}$ is the curvature on a plane II of the object 1, $\rho_{2I}$ is the curvature on the plane I of an object 2, and $\rho_{2II}$ is the curvature on the plane II of the object 2. The curvature has a negative sign in the case of a concave surface like the cam surface 304. In addition, ω is an angle formed by the plane I of the object 1 and the plane I of the object 2 (the plane II of the object 1 and the plane II of the object 2). In the case of the contact of the outer circumferential surface 204 and the cam surface 304, the plane I of the object 1 and the plane I of the object 2 coincide and the angle ω can be considered as 0, and thus [MATH. 1] is expressed as follows.

$$\cos\tau = \frac{|\rho_{1I}-\rho_{1II}| + |\rho_{2I}-\rho_{2II}|}{\rho_{1I}+\rho_{1II}+\rho_{2I}+\rho_{2II}} \quad [\text{MATH. 2}]$$

The auxiliary variable cos τ is indicated as follows through complete elliptic integrals.

$$\cos\tau = \frac{(2-k^2)E - 2(1-k^2)K}{k^2 E} \quad [\text{MATH. 3}]$$

Here, K and E are the complete elliptic integrals of a first kind and a second kind respectively, and are indicated as follows.

$$K = \int_0^{\pi/2} \frac{d\theta}{\sqrt{1-k^2\sin^2\theta}} \quad [\text{MATH. 4}]$$

$$E = \int_0^{\pi/2} \sqrt{1-k^2\sin^2\theta}\, d\theta$$

Then, the long radius a and the short radius b of a contact ellipse which is the contact portion of the two objects are indicated as follows.

$$a = \mu\sqrt[3]{\frac{3P}{8}\frac{\Theta_1+\Theta_2}{\rho_{1I}+\rho_{1II}+\rho_{2I}+\rho_{2II}}} = \mu\sqrt[3]{\frac{3P}{8}\frac{\sum\Theta}{\sum\rho}} \quad [\text{MATH. 5}]$$

$$b = \nu\sqrt[3]{\frac{3P}{8}\frac{\Theta_1+\Theta_2}{\rho_{1I}+\rho_{1II}+\rho_{2I}+\rho_{2II}}} = \nu\sqrt[3]{\frac{3P}{8}\frac{\sum\Theta}{\sum\rho}}$$

Here, $\Theta_1$ and $\Theta_2$ are indicated as follows by respective Poisson's ratios $1/m_1$ and $1/m_2$ of the objects 1 and 2 and respective Young's moduli $E_1$ and $E_2$ of the objects 1 and 2. Note that the Poisson's ratio and the Young's modulus are values determined by materials of the outer ring portion 202 and the cam rib 303.

$$\Theta_1 = \frac{4\cdot(m_1^2-1)}{m_1^2\cdot E_1} \quad [\text{MATH. 6}]$$

$$\Theta_2 = \frac{4\cdot(m_2^2-1)}{m_2^2\cdot E_2}$$

In addition, μ and ν are indicated as follows.

$$\mu = \sqrt[3]{\frac{1}{1-k^2}\frac{2E}{\pi}} \quad [\text{MATH. 7}]$$

$$\nu = \sqrt[3]{(1-k^2)^{1/2}\frac{2E}{\pi}}$$

When the above formulas are used, a pressure σ at an arbitrary position (x, y) within the contact portion of the contact ellipse having the long radius a and the short radius b is indicated as follows.

$$\sigma = \frac{3P}{2\pi ab}\sqrt{1-\left(\frac{x}{a}\right)^2-\left(\frac{y}{b}\right)^2} \quad [\text{MATH. 8}]$$

Then, a maximum pressure $\sigma_{max}$ is indicated as follows.

$$\sigma_{max} = \frac{3P}{2\pi ab} \quad [\text{MATH. 9}]$$

As shown in FIG. 12, since the state that the outer circumferential surface 204 and the cam surface 304 are in contact is considered as the line contact, when a circumferential direction contact width of the contact portion in the line contact is defined as b', the contact width b' and a maximum pressure $\sigma_{max}'$ are indicated as follows by the length L of the contact length 214 of the contact portion and the applied load P.

$$b' = \sqrt{\frac{4}{\pi}\frac{P}{L}\frac{\sum\Theta}{\sum\rho}} \quad \text{[MATH. 10]}$$

$$\sigma'_{max} = \sqrt{\frac{1}{\pi}\frac{P}{L}\frac{\sum\rho}{\sum\Theta}} = \frac{2P}{\pi b'L}$$

Here, in the case that the outer circumferential surface 204 and the cam surface 304 are in the line contact, the first radius 212 of curvature of the arc shape of the outer circumferential surface 204 and the radius 306 of curvature of the arc shape of the cam surface 304 may be determined so that a long diameter 2a of the contact ellipse is 1.5 times the length L of the contact length 214, such that the outer ring portion 202 does not move in the direction of the center axis line 203, the applied load P is equally received at the contact portion and edge stress is not generated at an end of the outer circumferential surface 204. In this case, it is b'=b and $\sigma_{max}'=\sigma_{max}$.

To be more concrete, as shown in FIG. 12, in the case where the first radius 212 of curvature of the arc shape of the outer circumferential surface 204 is $R_x$ and the radius 306 of curvature of the arc shape of the cam surface 304 is $-1/R_r$, since the curvatures are $\rho_{1I}=1/r$, $\rho_{1II}=1/R_x$, $\rho_{2I}=0$, and $\rho_{2II}=-1/R_r$, the value COST can be obtained by [MATH. 2], and when k, K and E are determined so that [MATH. 3] coincides with the value, μ and v can be obtained by [MATH. 7]. Further, the long radius a and the short radius b of the contact ellipse can be obtained by [MATH. 5]. Then, while changing the respective values of $R_x$ as the first radius 212 of curvature and $R_r$ as the radius 306 of curvature, the long radius a of the contact ellipse that matches with 2a=1.5 L, and by using the outer circumferential surface 204 and the cam surface 304 respectively having $R_x$ as the first radius 212 of curvature and $R_r$ as the radius 306 of curvature with which the long radius a of the matching contact ellipse is obtained, the outer ring portion 202 is prevented from moving in the direction of the center axis line 203, and the outer ring portion 202 and the cam rib 303 can equally receive the applied load P at the contact portion further. Note that, in FIG. 12, the outer circumferential surface 204 has the convex surface shape to the center axis line 203 of the outer ring portion 202 and the contact portion of the cam surface 304 has the concave surface shape conforming to the convex surface shape of the outer circumferential surface 204, however, as shown in FIG. 7, even when the outer circumferential surface 204 has the concave surface shape to the center axis line 203 of the outer ring portion 202 and the contact portion of the cam surface 304 has the convex surface shape conforming to the concave surface shape of the outer circumferential surface 204, the long radius a of the contact ellipse that matches with 2a=1.5 L can be obtained while changing $R_x$ as the first radius 212 of curvature and $R_r$ as the radius 306 of curvature as described above. Note that the second radius 213 of curvature can be also obtained similarly to the first radius 212 of curvature.

In addition, it may be assumed that the cam surface 304 is a plane, the long radius a of the contact ellipse that matches with 2a=1.5 L may be obtained while changing $R_y$ as a temporary first radius 212 of curvature, and the $R_x$ as the first radius 212 of curvature and $R_r$ as the radius 306 of curvature may be obtained from $R_y$ as the temporary first radius 212 of curvature with which the long radius a of the matching contact ellipse is obtained. In this case, the contact width b' of the contact portion and the maximum pressure $\sigma_{max}'$ are the same as [MATH. 10], and $\Sigma\rho$ is indicated as follows.

$$\Sigma\rho=\rho_{1I}+\rho_{1II}' \quad \text{[MATH. 11]}$$

Here, $\rho_{1II}'$ is a curvature by $R_y$ as the temporary first radius 212 of curvature. Since $\Sigma\rho$ by $R_y$ as the temporary first radius 212 of curvature and $\Sigma\rho$ by $R_x$ as the first radius 212 of curvature and $R_r$ as the radius 306 of curvature are the same, it is indicated as follows.

$$\sum\rho = \frac{1}{r} + \frac{1}{R_y} = \frac{1}{r} + \frac{1}{R_x} - \frac{1}{R_r} \quad \text{[MATH. 12]}$$

In this way, $R_x$ as the first radius 212 of curvature and $R_r$ as the radius 306 of curvature that match with 2a=1.5 L may be obtained more easily.

Each of the bearings 201 may be a roller follower or a cam follower.

Each of the bearings 201 includes the shaft member 205 and the outer ring portion 202 capable of rotating along the outer circumferential surface of the shaft member 205 or the like, and may be a rolling contact bearing that includes the needles or rotating rollers 206 or the like between the shaft member 205 and the outer ring portion 202 or a sliding contact bearing not including the needles or rotating rollers 206 or the like.

It should be further understood by those skilled in the art that although the foregoing description has been made on embodiments of the present invention, the present invention is not limited thereto and various changes and modifications may be made without departing from the spirit of the present invention and the scope of the appended claims.

The invention claimed is:

1. A roller gear cam mechanism comprising:
a cam that is capable of rotating on a cam axis line, and has a screw shape including a cam rib and a cam groove;
a rotating member that is capable of rotating on a rotating member axis line vertical to the cam axis line; and
multiple bearings that are arranged along an outer circumferential direction of the rotating member, and are capable of being in rolling contact with the cam rib, wherein
each of the bearings includes a shaft member and an outer ring portion capable of rotating around the shaft member,
at least a portion of an outer circumferential surface of the outer ring portion has an arc shape in a cross section of the outer ring portion including a center axis line of the outer ring portion, a contact portion of the cam rib making contact with at least a portion of the outer circumferential surface of the outer ring portion has an arc shape in a cross section of the cam including the cam axis line, and the arc shape of the outer ring portion is formed so as to conform to the arc shape of the cam rib, and
a radius of curvature of the arc shape of the outer ring portion and a radius of curvature of the arc shape of the cam rib are determined in association with each other, wherein
at least a portion of the outer circumferential surface of the outer ring portion has a convex surface shape to the center axis line, the contact portion of the cam rib has a concave surface shape conforming to the convex surface shape, and the radius of curvature of the arc shape of the cam rib is larger than the radius of curvature of the arc shape of the outer ring portion, or at least a portion of the outer circumferential surface of the outer ring portion has a concave surface shape to the center axis line, the contact portion of the cam rib has a convex surface shape conforming to the concave surface shape, and the radius of curvature of the arc shape of the outer ring portion is larger than the radius of curvature of the arc shape of the cam rib.

2. The roller gear cam mechanism according to claim 1, wherein the radius of curvature on a side of the rotating member axis line of the arc shape of the outer ring portion is different from the radius of curvature on a side of the cam axis line of the arc shape of the outer ring portion.

3. The roller gear cam mechanism according to claim 1, wherein the radius of curvature on a side of the rotating member axis line of the arc shape of the cam rib is different from the radius of curvature on a side of the cam axis line of the arc shape of the cam rib.

4. The roller gear cam mechanism according to claim 1, wherein the radius of curvature of the arc shape of the outer ring portion and the radius of curvature of the arc shape of the cam rib are determined in association with each other, based on at least one of a preload given between each of the bearings and the cam rib, an applied load given between each of the bearings and the cam rib while the roller gear cam mechanism is operated, and an unbalanced load given by the outer ring portion moving in a direction of the center axis line.

5. The roller gear cam mechanism according to claim 1, wherein the shaft member includes a pair of flange portions configured to hold an inner side portion of the outer ring portion between the flange portions, a gap is provided between each of the pair of flange portions and the inner side portion of the outer ring portion, and the radius of curvature of the arc shape of the outer ring portion and the radius of curvature of the arc shape of the cam rib are determined in association with each other so that the outer ring portion does not move for a width of the gap or more in the direction of the center axis line when each of the bearings is in contact with the cam rib.

6. The roller gear cam mechanism according to claim 1, wherein the outer ring portion and the cam rib can be in line contact, and the radius of curvature of the arc shape of the outer ring portion and the radius of curvature of the arc shape of the cam rib are determined in association with each other so that an applied load is equally received at the contact portion of the cam rib.

7. The roller gear cam mechanism according to claim 1, wherein each of the bearings is a roller follower or a cam follower.

8. The roller gear cam mechanism according to claim 1, wherein each of the bearings is a rolling contact bearing or a sliding contact bearing.

9. A roller gear cam mechanism comprising:
a cam that is capable of rotating on a cam axis line, and has a screw shape including a cam rib and a cam groove;
a rotating member that is capable of rotating on a rotating member axis line vertical to the cam axis line; and
multiple bearings that are arranged along an outer circumferential direction of the rotating member, and are capable of being in rolling contact with the cam rib, wherein
each of the bearings includes a shaft member and an outer ring portion capable of rotating around the shaft member,
at least a portion of an outer circumferential surface of the outer ring portion has an arc shape in a cross section of the outer ring portion including a center axis line of the outer ring portion, a contact portion of the cam rib making contact with at least a portion of the outer circumferential surface of the outer ring portion has an arc shape in a cross section of the cam including the cam axis line, and the arc shape of the outer ring portion is formed so as to conform to the arc shape of the cam rib,
a radius of curvature of the arc shape of the outer ring portion and a radius of curvature of the arc shape of the cam rib are determined in association with each other, and
at least a portion of the outer circumferential surface of the outer ring portion has a convex surface shape to the center axis line, the contact portion of the cam rib has a concave surface shape conforming to the convex surface shape, and the radius of curvature of the arc shape of the cam rib is larger than the radius of curvature of the arc shape of the outer ring portion.

10. The roller gear cam mechanism according to claim 9, wherein the radius of curvature of the arc shape of the outer ring portion is equal to or greater than a distance from the center axis line to at least a portion of the outer circumferential surface.

11. A roller gear cam mechanism comprising:
a cam that is capable of rotating on a cam axis line, and has a screw shape including a cam rib and a cam groove;
a rotating member that is capable of rotating on a rotating member axis line vertical to the cam axis line; and
multiple bearings that are arranged along an outer circumferential direction of the rotating member, and are capable of being in rolling contact with the cam rib,
wherein
each of the bearings includes a shaft member and an outer ring portion capable of rotating around the shaft member,
at least a portion of an outer circumferential surface of the outer ring portion has an arc shape in a cross section of the outer ring portion including a center axis line of the outer ring portion, a contact portion of the cam rib making contact with at least a portion of the outer circumferential surface of the outer ring portion has an arc shape in a cross section of the cam including the cam axis line, and the arc shape of the outer ring portion is formed so as to conform to the arc shape of the cam rib,
a radius of curvature of the arc shape of the outer ring portion and a radius of curvature of the arc shape of the cam rib are determined in association with each other, and
at least a portion of the outer circumferential surface of the outer ring portion has a concave surface shape to the center axis line, the contact portion of the cam rib has a convex surface shape conforming to the concave surface shape, and the radius of curvature of the arc shape of the outer ring portion is larger than the radius of curvature of the arc shape of the cam rib.

* * * * *